June 8, 1937.  W. F. HEROLD  2,082,798
COMPENSATING WHEELED STRUCTURE
Filed June 5, 1935
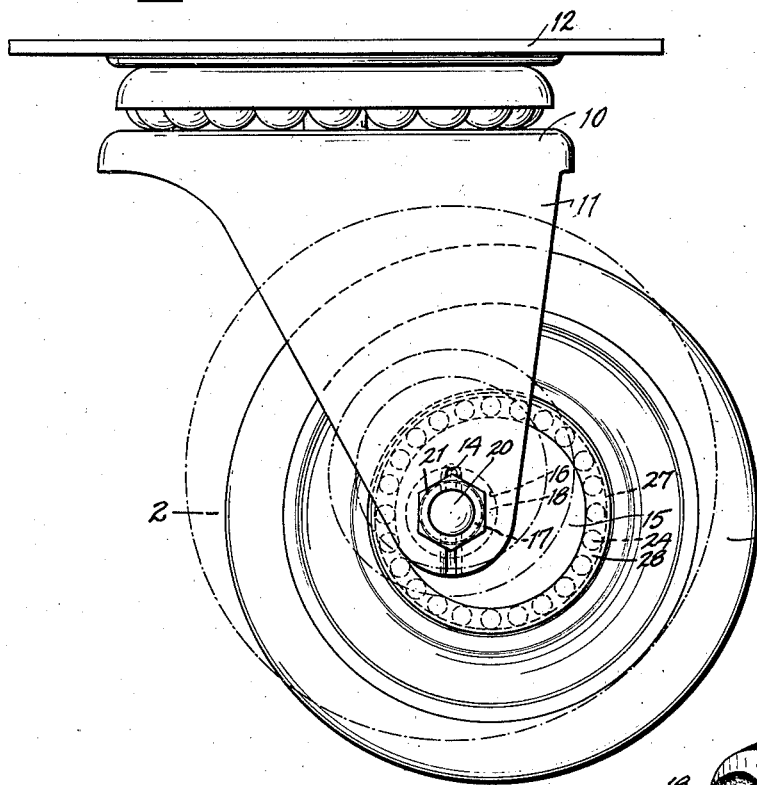
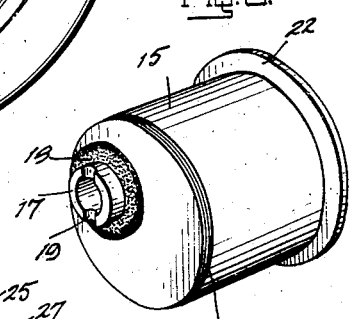
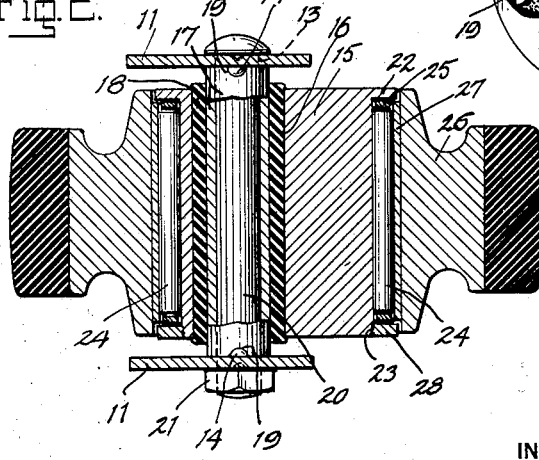
INVENTOR
WALTER F. HEROLD.
BY
ATTORNEY Patented June 8, 1937

2,082,798

UNITED STATES PATENT OFFICE 2,082,798

COMPENSATING WHEELED STRUCTURE

Walter F. Herold, Bridgeport, Conn., assignor to The Bassick Company, Bridgeport, Conn., a corporation of Connecticut Application June 5, 1935, Serial No. 25,060

REISSUED

5 Claims. (Cl. 16—46)

The present invention relates to a compensating wheeled structure and has application in any type of wheeled structure where a compensating action is desired. While the invention may be incorporated in casters or other wheeled structures of any suitable type it is particularly adapted for heavy duty as for instances casters as employed on trucks. An object of the invention is to provide a compensating wheeled structure in which the compensating action takes place in a rubber tension element. Another object is to provide a compensating wheeled structure in which the compensating means is arranged within the wheel and which may be incorporated in the wheeled structure without materially changing its normal construction or design. Another object is to provide a compensating wheeled structure in which the compensating means is adapted to build up pressure as the load is increased, and also to gradually reduce the extent of the compensating movement as the load is increased.

It is particularly proposed to provide compensating means in the form of a torsional joint of rubber or other suitable resilient material interposed between the wheel supporting or supported structure and the wheel bearing, the wheel bearing being eccentric to the torsional joint. The rubber is preferably in the form of a cylinder disposed under permanent pressure and tension between two coaxial members disposed one within the other and to each of which the rubber member is in effect bonded, the relative movement between these coaxial members being resiliently supported by the tension produced by torsional strain in the compressed rubber.

Another object is to provide compensating means which will be noiseless in operation, will not deteriorate to any appreciable extent even after long and excessive use, and will require no lubrication.

With the above and other objects in view, an embodiment of the invention is shown in the accompanying drawing, and this embodiment will be hereinafter more fully described with reference thereto, and the invention will be finally pointed out in the drawing.

In the drawing:

Fig. 1 is a side elevation of a compensating caster, embodying the present invention, the dot-and-dash lines representing the full deflected position of the caster wheel.

Fig. 2 is a horizontal sectional view taken along the line 2—2 of Fig. 1.

Fig. 3 is a perspective view of the torsion element employed.

Similar reference characters indicate corresponding parts throughout the several figures of the drawing.

Referring to the drawing the compensating caster according to the exemplary illustrated embodiment of the invention, comprises a caster horn of conventional type having a top portion 10 and side legs 11—11, the top portion 10 being swivelly connected in the usual manner to a top plate 12. The caster horn is provided in each of the side leg portions 11 with a bolt receiving aperture 13 and with inwardly embossed vertically extending ribs 14—14 extending above and below the respective apertures, for the purpose of rigidly locking the spindle to the horn as will presently more fully appear.

The torsion element comprises an outer member 15 constituting the wheel bearing and provided with an eccentrically disposed passage 16 therethrough, an inner tubular member 17, and a cylindrical body of rubber 18 between them, this rubber body being highly compressed and confined between the members 15 and 17 and being in effect bonded to their surfaces, so that upon relative rotary movement between the members 15 and 17 the rubber body is put under torsional strain. In practice the rubber body is bonded to the inner member 17, as by vulcanization and is then forced into the passage 16 of the outer member 15 under great pressure, its diameter prior to insertion in the member 15 being considerably greater than the diameter of the passage 16, so that the rubber is thus highly compressed and is in effect bonded to the surface of the passage 16 by the great surface friction set up between them under compression.

The ends of the rubber project beyond the ends of the member 15, and the ends of the inner member 17 project beyond the rubber member and are provided with grooves 19 which are adapted to be interlockingly engaged with the ribs 14 of the side legs 11 of the horn, a tie-bolt 20 having a head at one end being engaged through the bore of the member 17 and through the apertures 13—13 and having a nut 21 screwed upon its threaded end, this assembly rigidly connecting the member 17 to the horn and providing a supporting spacer or strut between the side legs of the horn.

The member 15 which constitutes a bearing for the wheel is provided at one end with an outwardly extending annular flange 22 and at its other end with screw threads 23. Roller bearings 24 supported in a suitable cage 25 are engaged about the member 15, and the wheel 26 having a bearing bushing 27 inserted and secured therein is engaged with the roller bearings, a retaining ring 28 being screwed upon the screw-threaded end 23 of the member 15 to retain the roller bearings and the wheel against lateral displacement. The diameter of the flange 22 and the ring 28 being greater than the internal diameter of the bushing 27 the ends of the bushing are thus retained against lateral displacement by abutment with the flange 22 and ring 28.

In the normal position of the wheel the member 15 is disposed with its widest radial dimension extending from the axis of the member 17 in a horizontal plane and projecting forwardly with respect to the caster horn. As load is imposed upon the caster or when the same strikes an obstruction the member 15 will swing upwardly in counter-clockwise direction about the member 17 causing the rubber member to become tensioned through the torsional strain set up therein, the tension gradually building up as the upward swing of the wheel member 15 increases, so that as there is an increased load upon the wheel there is increased tension in the rubber element to compensate for and support it. As the member 15 reaches a position where its wide radius with respect to the axis of the member 17 is in a vertical plane no further movement in counter-clockwise direction takes place, and in this position the load is solidly supported, as the rubber is under such high compression that it will support the member 17 against radial displacement with respect to the member 15 under any of the usual loads that may be supported upon the caster. As the wheel swings upwardly the amount of vertical movement for a given angular movement gradually decreases, at the same time decreasing the amount of offset of the wheel axis from the swiveling axis, so that as the load gets heavier torsional strains set up in the horn due to offset are decreased, and the caster or other wheeled structure is therefore capable of efficiently carrying the heavier loads. With this invention the offset may be substantially greater than in usual caster designs, so that upon reaching the maximum load position, indicated by the dot-and-dash lines in Fig. 1, the offset will be substantially the same as that obtaining in said usual caster designs. At the same time the greater offset under light loads results in increased mechanical advantage in swivelling and also in the compensating and cushioning action of the caster. The casters are self leveling when used on trucks, so that they all remain in contact with the floor at all times, and the cushioning action is such that even with hard treads upon the wheels the casters will be as easy-riding and noiseless as pneumatic tired wheels.

I have illustrated and described a preferred and satisfactory embodiment of my invention, but it will be obvious that changes may be made therein, within the spirit and scope thereof as defined in the appended claims.

Having thus described my invention what I claim and desire to secure by Letters Patent is:—

1. In a compensating wheeled structure, a wheel carrying member including a spindle, an eccentric bearing member disposed about said spindle, a wheel mounted on said eccentric member, and a body of rubber disposed between said spindle and said bearing member, said bearing member adapted to rotate about said spindle as load is imposed on the caster to tension said rubber body through torsional strain set up therein.

2. In a compensating wheeled structure, a wheel carrying member including a spindle, an eccentric bearing member disposed about said spindle, a wheel mounted on said eccentric member, and a body of rubber compressed and confined between said spindle and said bearing member, said bearing member adapted to rotate about said spindle as load is imposed on the caster to tension said rubber body through torsional strain set up therein.

3. In a compensating wheeled structure, a wheel carrying member including a spindle, an eccentric bearing member disposed about said spindle, a wheel mounted on said eccentric member, and a body of rubber disposed between said spindle and said bearing member, the axis of said wheel being offset relative to the axis of said spindle in a direction substantially at a right angle to the direction of the load in the no-load untensioned condition of said wheeled structure, said bearing member adapted to rotate about said spindle as load is imposed on the wheeled structure to tension said rubber body through torsional strain set up therein.

4. In a compensating wheeled structure, a wheel carrying member including a spindle, an eccentric bearing member disposed about said spindle, a wheel mounted on said eccentric member, and a body of rubber disposed between said spindle and said bearing member, said bearing member adapted to rotate about said spindle as load is imposed on the wheeled structure to tension said rubber body through torsional strain set up therein, the axis of said wheel being substantially in a plane parallel to the direction of the load and passing through the axis of said spindle in the full load tensioned condition of said wheeled structure.

5. In a compensating wheeled structure, a wheel carrying member including a spindle, an eccentric bearing member disposed about said spindle, a wheel mounted on said eccentric member, and a body of rubber disposed between said spindle and said bearing member, the axis of said wheel being offset relative to the axis of said spindle in a direction substantially at a right angle to the direction of the load in the no-load untensioned condition of said wheeled structure, said bearing member adapted to rotate about said spindle as load is imposed on the wheeled structure to tension said rubber body through torsional strain set up therein, the axis of said wheel being substantially in a plane parallel to the direction of the load and passing through the axis of said spindle in the full load tensioned condition of said wheeled structure.

WALTER F. HEROLD.